United States Patent
Lee et al.

(10) Patent No.: US 8,804,588 B2
(45) Date of Patent: Aug. 12, 2014

(54) METHOD FOR SAVING POWER IN A MULTI-CARRIER WIRELESS ACCESS SYSTEM

(75) Inventors: Eun Jong Lee, Anyang-si (KR); Moon Il Lee, Anyang-si (KR); Hyun Soo Ko, Anyang-si (KR); Hyung Ho Park, Anyang-si (KR); Doo Hyun Sung, Anyang-si (KR); Han Gyu Cho, Anyang-si (KR); Jae Hoon Chung, Anyang-si (KR); Jong Young Han, Anyang-si (KR); Kyu Jin Park, Anyang-si (KR); Seung Hee Han, Anyang-si (KR); Jin Soo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 206 days.

(21) Appl. No.: 13/056,130

(22) PCT Filed: Jul. 29, 2009

(86) PCT No.: PCT/KR2009/004221
§ 371 (c)(1),
(2), (4) Date: Jan. 27, 2011

(87) PCT Pub. No.: WO2010/013942
PCT Pub. Date: Feb. 4, 2010

(65) Prior Publication Data
US 2011/0128901 A1    Jun. 2, 2011

Related U.S. Application Data

(60) Provisional application No. 61/084,613, filed on Jul. 29, 2008, provisional application No. 61/089,881, filed on Aug. 18, 2008, provisional application No. 61/092,734, filed on Aug. 28, 2008, provisional application No. 61/104,248, filed on Oct. 9, 2008.

(51) Int. Cl.
*H04W 52/02*    (2009.01)

(52) U.S. Cl.
CPC ............................... *H04W 52/0216* (2013.01)
USPC ........................... 370/311; 370/318; 370/329

(58) Field of Classification Search
None
See application file for complete search history.

(56) References Cited

U.S. PATENT DOCUMENTS

| | | | |
|---|---|---|---|
| 8,095,106 B2* | 1/2012 | Kone et al. | 455/343.1 |
| 2007/0091817 A1* | 4/2007 | Yoon et al. | 370/252 |
| 2007/0201419 A1* | 8/2007 | Miller et al. | 370/338 |
| 2007/0211654 A1* | 9/2007 | Kim et al. | 370/318 |
| 2007/0237104 A1 | 10/2007 | Alon et al. | |
| 2009/0257387 A1* | 10/2009 | Gholmieh et al. | 370/329 |
| 2009/0274120 A1* | 11/2009 | Chou | 370/331 |

FOREIGN PATENT DOCUMENTS

CN    1784033 A    6/2006

* cited by examiner

*Primary Examiner* — Hassan Kizou
*Assistant Examiner* — Tejis Daya
(74) *Attorney, Agent, or Firm* — McKenna Long & Aldridge LLP

(57) ABSTRACT

A method for saving power in a multi-carrier wideband wireless access system is provided. A method for saving the power of a receiver in a multi-carrier wireless communication system includes acquiring multi-carrier information from a transmitter on a primary carrier, entering one or more secondary carriers satisfying a predetermined power saving mode entry condition out of one or more secondary carriers included in the multi-carrier information into a power saving mode, and receiving data during a listening interval according to the power saving mode on the one or more secondary carriers entering the power saving mode. The multi-carrier information includes at least one of information about a plurality of available carriers, information indicating the primary carrier and the one or more secondary carriers out of the plurality of available carriers, and information about the power saving mode entry condition of the one or more secondary carriers.

6 Claims, 15 Drawing Sheets

FIG. 1
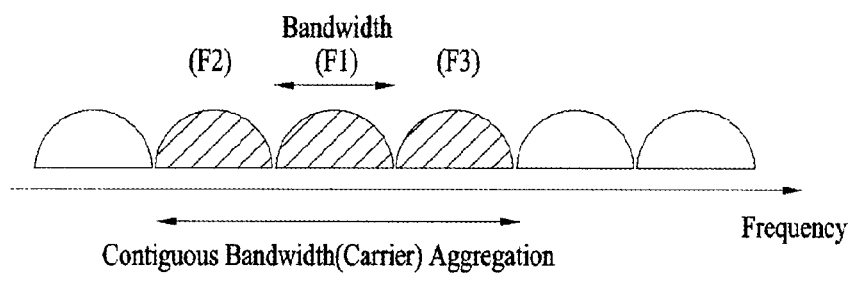
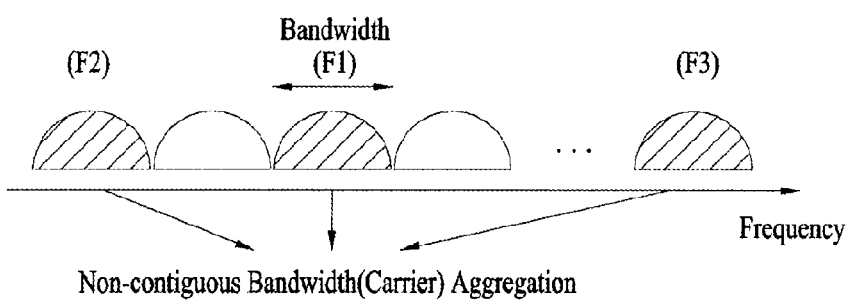

FIG. 4
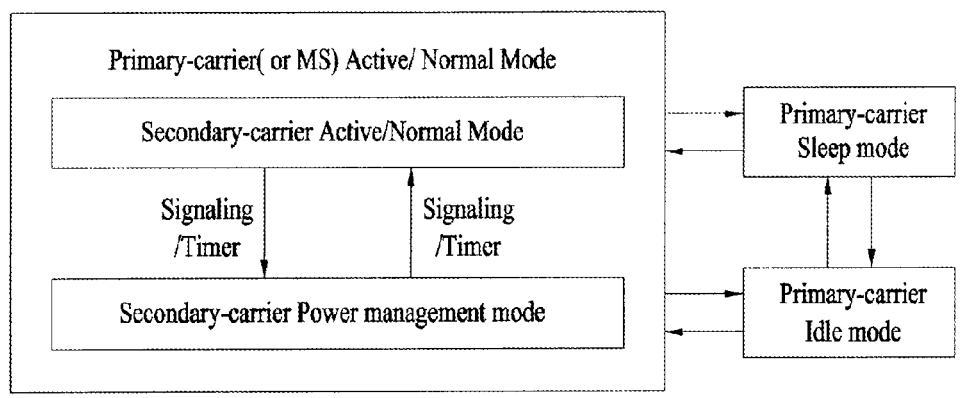
(a)
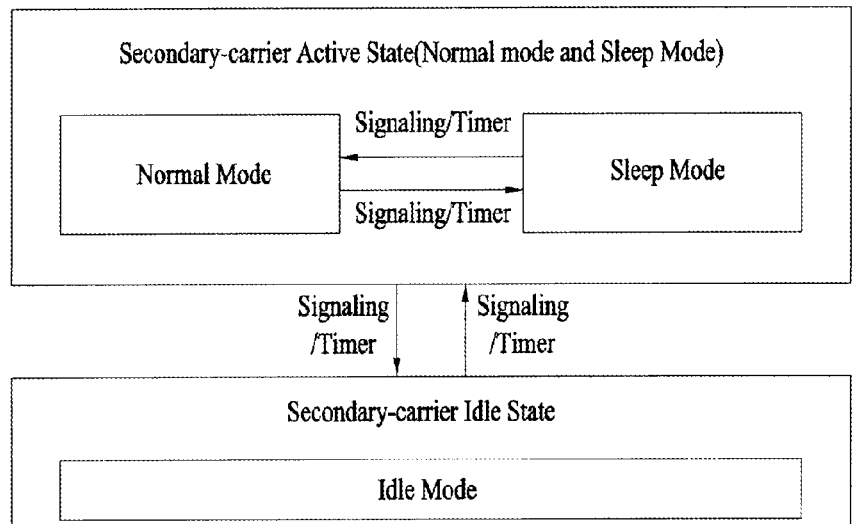
(b)

FIG. 13
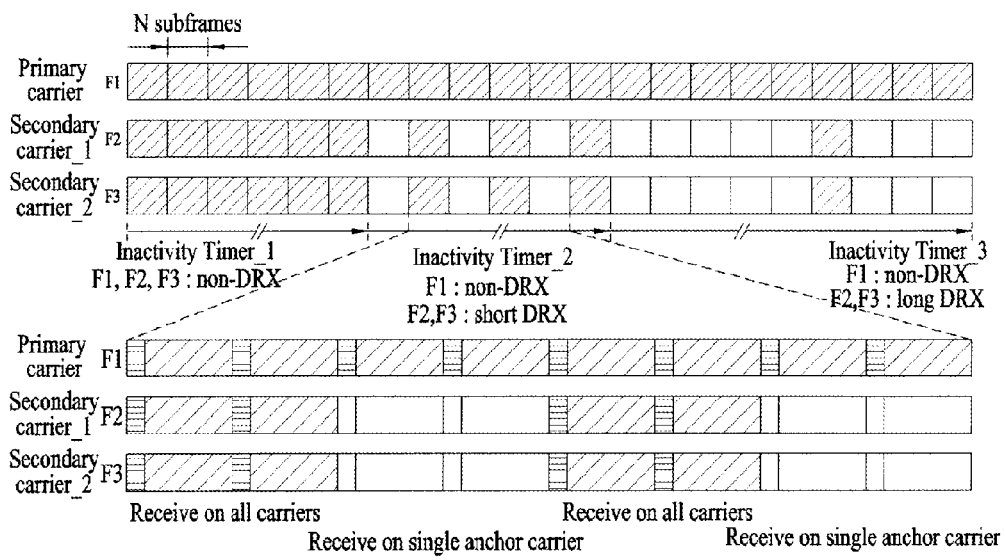
(a)
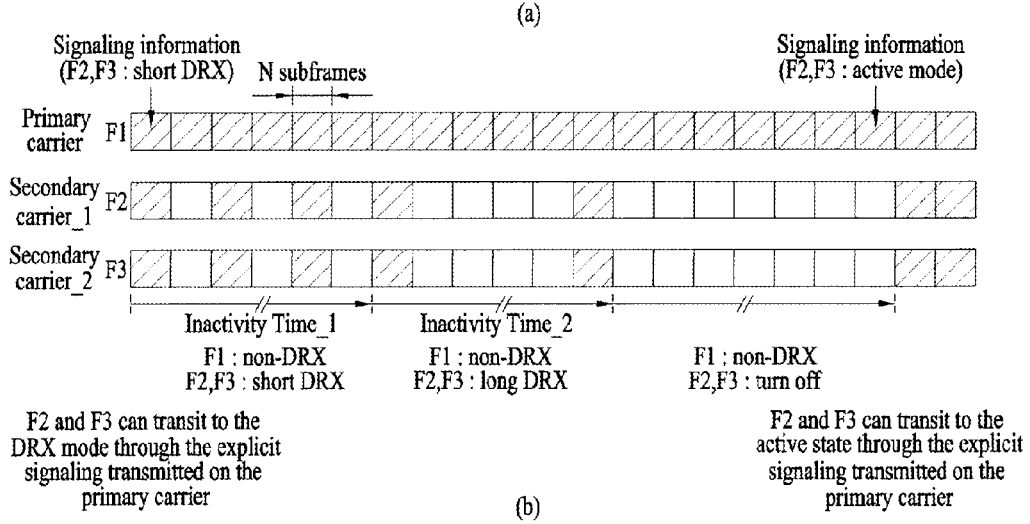
(b)

METHOD FOR SAVING POWER IN A MULTI-CARRIER WIRELESS ACCESS SYSTEM

This application is a National Stage Entry of International Application No. PCT/KR2009/004221, filed Jul. 29, 2009, and claims the benefit of U.S. Provisional Application Ser. No. 61/084,613, filed Jul. 29, 2008, U.S. Provisional Application Ser. No. 61/089,881, filed Aug. 18, 2008, U.S. Provisional Application Ser. No. 61/092,734, filed Aug. 28, 2008, and U.S. Provisional Application Ser. No. 61/104,248, filed Oct. 9, 2008, all of which are hereby incorporated by reference in their entirety herein.

TECHNICAL FIELD

The present invention relates to a wireless access system, and more particularly, to a method for saving power in a multi-carrier wideband wireless access system.

BACKGROUND ART

Hereinafter, a general wireless communication system using multiple carriers will be described.

FIG. 1 is a view showing an example of the use of multiple carriers in a general wireless access system.

The multiple carriers in the general wireless access system may employ contiguous carrier aggregation as shown in FIG. 1(a) or non-contiguous carrier aggregation as shown in FIG. 1(b). The combination unit of such carriers is a basic bandwidth unit of a general legacy system (e.g., Long Term Evolution (LTE) in an LTE-advanced system or IEEE802.16e in an IEEE802.16m system). In a multi-carrier environment of general technology, two types of carriers are defined as follows.

First, a primary carrier is the carrier used by a Base Station (BS) and a Mobile Station (MS) to exchange traffic and full PHY/MAC control information defined in the IEEE 802.16m specification. Further, the primary carrier is used for control functions for proper MS operation, such as network entry. Each MS shall have only one carrier it considers to be its primary carrier in a cell.

A secondary carrier is an additional carrier which the MS may use for traffic, only per BS's specific allocation commands and rules, typically received on the primary carrier. The secondary carrier may also include control signaling to support multi-carrier operation.

In the general technology, the carriers of a multi-carrier system based on the above-described primary and secondary carriers may be differently configured as follows.

First, a fully configured carrier is a carrier for which all control channels including synchronization, broadcast, multicast and unicast control signaling are configured. Further, information and parameters regarding multi-carrier operation and the other carriers can also be included in the control channels.

A partially configured carrier is a carrier with only essential control channel configuration to support traffic exchanges during multi-carrier operation.

The primary carrier needs to be fully configured r. In contrast, the secondary carrier may be fully or partially configured according to the user's requirements and the channel state. In addition, when a full configured carrier in the cell is configured as a primary carrier, any MS may be controlled by the primary carrier. In addition, the MS may dynamically use multiple secondary carriers, for data transmission.

Next, a sleep mode of the MS, which is used in the related art, will be described. The MS may configure three types of sleep mode patterns (or Power Saving Classes (PSCs)). In the present specification, "sleep mode type X" has the same meaning as "PSC type X".

First, Sleep Mode Type 1 which is an example of the sleep mode pattern may be applied to Best Effort (BE) or Non-Real-Time Variable Rate (NRT-VR) type data transmission. In the present pattern, if downlink (DL) traffic is transmitted by a connection, a MOB TRF-IND (Traffic Indication) message is transmitted from a BS to an MS during a listening interval. When the BS sends the MOB TRF-IND message, the MS may complete the active state of the PSC. In addition, the MS may receive all DL data during the listening interval as in a normal operation.

Next, Sleep Mode Type 2 may be applied to Unsolicited Grant Service (UGS) and Real-Time Variable Rate (RT-VR) type data transmission, that is, a service for periodically transmitting or receiving data. The MS may not transmit or receive a MAC Service Data Unit (MSDU) or a MAC Protocol Data Unit (MPDU) during a sleep interval. However, the MS may also transmit or receive ACK/NACK for data as well as MSDUs or fragments generated by connections during a listening interval.

Finally, Sleep Mode Type 3 may be applied to multicast connections or management operations, such as periodic ranging or the transmission of a neighboring advertisement (MOB_NBR-ADV) message.

If data is transmitted using multiple carriers in the general wireless access system, information about the multiple carriers available to any MS in one cell may be transmitted from a BS to an MS through system information. When the carriers available to the MS are set, the MS should check whether there is data transmitted to the MS on the carriers while monitoring the control channels of all the available carriers.

FIG. 2 is a view showing a method for monitoring multiple carriers by any MS in the general technology. AN MS which enters any cell may receive multi-carrier information including information about multiple carriers available in the cell on a primary carrier. The MS should monitor the control channels during every subframe with respect to all the carriers available to the MS according to the received information about the multiple carriers.

DISCLOSURE

Technical Problem

If a service requiring a high data rate is provided, a Mobile Station (MS) and a Base station (BS) use multiple carriers to rapidly transmit a large amount of data using a wider bandwidth. However, the MS does not always use the bandwidth of all the multiple carriers. In this case, since the aggregated bandwidth allows the MS to monitor all the carriers, this leads to increased decoding overhead or power consumption.

An object of the present invention devised to solve the problem lies on a method for saving the power of an MS in a multi-carrier environment.

Another object of the present invention devised to solve the problem lies on various methods capable of more efficiently controlling the use of secondary carriers.

It is to be understood that the technical problems to be solved by the present invention are not limited to the above-described technical problems and other technical problems will become apparent to those having ordinary skill in the art from the following description.

Technical Solution

The object of the present invention can be achieved by providing a method for saving the power of a receiver in a multi-carrier wireless communication system, the method including: acquiring multi-carrier information from a transmitter on a primary carrier; entering one or more secondary carriers satisfying a predetermined power saving mode entry condition out of one or more secondary carriers included in the multi-carrier information into a power saving mode; and receiving data during a listening interval according to the power saving mode on the one or more secondary carriers entering the power saving mode, wherein the multi-carrier information includes at least one of information about a plurality of available carriers, information indicating the primary carrier and the one or more secondary carriers out of the plurality of available carriers, and information about the power saving mode entry condition of the one or more secondary carriers.

The primary carrier may be a primary carrier used by the transmitter and the receiver to exchange traffic and full Physical (PHY)/Media Access Control (MAC) control information.

The power saving mode may include a sleep mode, an idle mode and a Radio Frequency (RF) OFF mode, the sleep mode may have a predetermined period, the predetermined period may be divided into the listening interval and a sleep interval in which data is not received by the receiver, the idle mode may be a mode which enables the receiver to maintain a connection with the transmitter and has only the sleep interval, and the RF OFF mode may be a mode in which the receiver releases the connection with the transmitter and does not receive any data.

The method may further include changing the power saving mode of the one or more secondary carriers satisfying a predetermined power saving mode change condition out of the one or more secondary carriers entering the power saving mode.

The predetermined power saving mode entry condition may be any one of entry signaling or expiration of an entry timer on the primary carrier, and the predetermined power saving mode change condition may be any one of change signaling or expiration of a change timer on the primary carrier.

The method may further include completing the power saving mode of a specific secondary carrier and entering the specific secondary carrier into a normal mode, if data is received in the listening interval or there is normal-mode entry signaling on the primary carrier, with respect to the specific secondary carrier out of the one or more secondary carriers entering the power saving mode.

The sleep mode may follow any one of a plurality of sleep mode patterns in which the listening interval and the sleep interval are set in advance with different ratios and lengths.

With respect to a specific secondary carrier entering the sleep mode out of the one or more secondary carriers entering the power saving mode, the receiver may change the sleep mode from a current sleep mode pattern of the plurality of sleep mode patterns to a sleep mode pattern with a longest sleep interval whenever the change timer expires or whenever there is change signaling.

The entry timer and the change timer may be separately set with respect to the plurality of sleep mode patterns.

The entry timer may be simultaneously set in the transmitter and the receiver at a point of time when data is not allocated to a secondary carrier, to which data is not allocated, out of the one or more secondary carriers, and is reset at a point of time when data is allocated, and the change timer may be simultaneously set in the transmitter and the receiver at a point of time when data is not allocated to a secondary carrier, to which data is not allocated, out of the one or more secondary carriers entering the power saving mode, and is reset at a point of time when data is allocated.

If the sleep mode of a specific secondary carrier entering the sleep mode follows a sleep mode pattern with the longest sleep interval, the receiver may operate the specific secondary carrier in the idle mode if the change timer set with respect to the sleep mode pattern with the longest sleep interval expires.

The signaling may be performed through at least one of the multi-carrier information, a Media Access Control (MAC) management message, a 1-bit indicator and a bitmap.

The values of the entry timer and the change timer may be acquired by system information broadcast from the transmitter through a predetermined broadcast channel and an initial network entry process.

In another aspect of the present invention, provided herein is a method for supporting the power saving of a receiver by a transmitter in a multi-carrier wireless communication system, the method including: transmitting multi-carrier information to the receiver on a primary carrier; and transmitting data to the receiver during a listening interval according to a power saving mode on one or more secondary carriers entering the power saving mode out of one or more secondary carriers included in the multi-carrier information, wherein the multi-carrier information includes at least one of information about a plurality of available carriers, information indicating the primary carrier and the one or more secondary carriers out of the plurality of available carriers, and information about a power saving mode entry condition of the one or more secondary carriers.

The primary carrier may be a primary carrier used by the transmitter and the receiver to exchange traffic and full Physical (PHY)/Media Access Control (MAC) control information.

The power saving mode may include a sleep mode, an idle mode and a Radio Frequency (RF) OFF mode, the sleep mode may have a predetermined period, the predetermined period may be divided into the listening interval and a sleep interval in which data is not received by the receiver, the idle mode may be a mode which enables the receiver to maintain a connection with the transmitter and has only the sleep interval, and the RF OFF mode may be a mode in which the receiver releases the connection with the transmitter and does not receive any data.

With respect to a specific secondary carrier out of the one or more secondary carriers entering the power saving mode, if there is signaling on the primary carrier or if a predetermined timer expires, the receiver may change the power saving mode of the specific secondary carrier.

Advantageous Effects

According to the embodiments of the present invention, the following effects can be obtained.

First, it is possible to save the power of a Mobile Station (MS) according to the embodiments of the present invention.

Second, it is possible to reduce signaling overhead for controlling secondary carriers according to the embodiments of the present invention.

Third, it is possible to more efficiently and rapidly perform dynamic resource allocation to secondary carriers according to the embodiments of the present invention.

The effects which can be obtained by the present invention are not limited to the above-described effects and other effects can be understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a view showing an example of the use of multiple carriers in a general wireless communication system.

FIG. 4 is a view showing another example of a state diagram applicable to the operation of a secondary carrier according to the embodiments of the present invention.

FIG. 13 is a view showing an example of a multi-level sleep mode operation method of a secondary carrier according to another embodiment of the present invention.

BEST MODE

Figure 2:
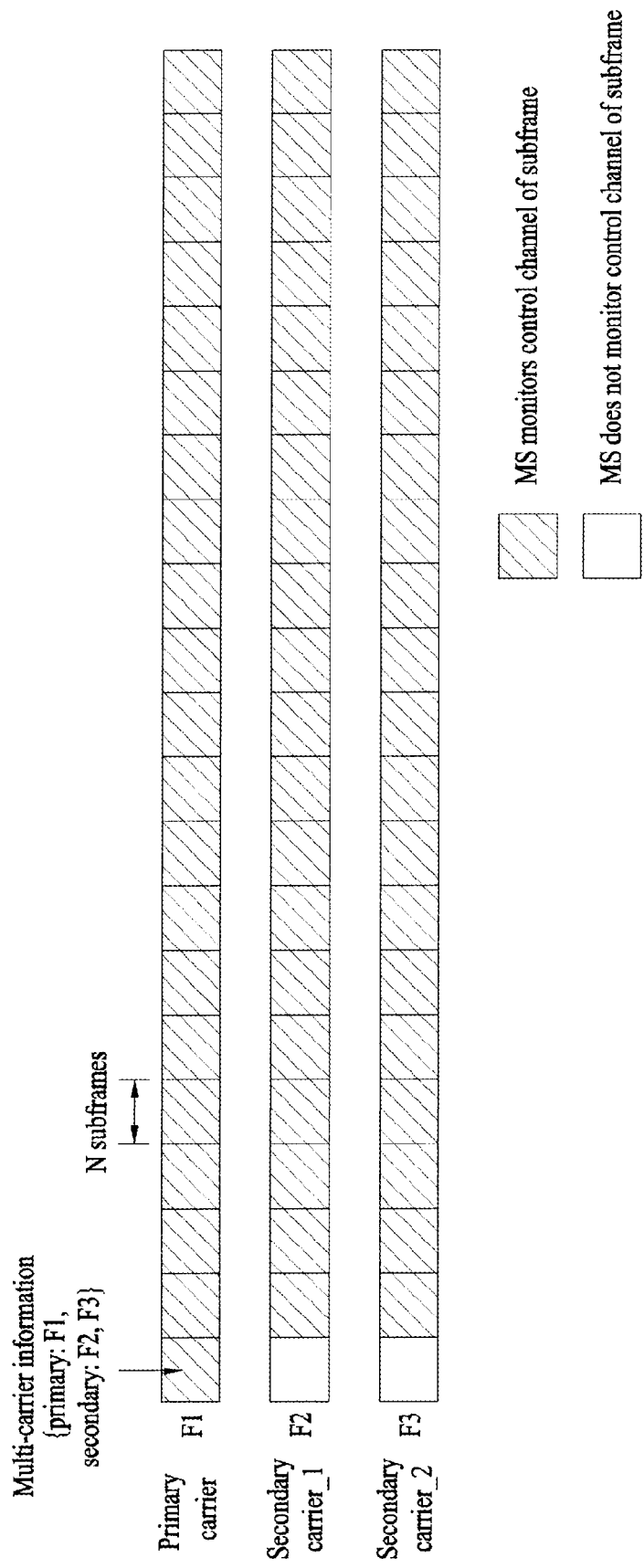
FIG. 2 is a view showing a method for monitoring multiple carriers by any MS in general wireless communication system.

The present invention relates to a wireless access system. Hereinafter, the embodiments of the present invention disclose a method for saving power in a multi-carrier broadband wireless access system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations described in the embodiments of the present invention may be changed. Some components or characteristics of any embodiment may also be included in other embodiments, or may be replaced with those of the other embodiments as necessary.

In the description of the drawings, procedures or steps which render the scope of the present invention unnecessarily ambiguous are not described, and the procedures or steps which can be understood by those skilled in the art are not described.

The embodiments of the present invention have been described based on the data transmission and reception between a base station and a mobile station. In this case, the base station means a terminal node of a network, which performs direct communication with the mobile station. A specific operation which is described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as a user equipment (UE), a subscriber station (SS), a mobile subscriber station (MSS), and a terminal.

Furthermore, a transmitter means a fixed and/or mobile node that transmits data service or voice service, and a receiver means a fixed and/or mobile node that receives data service or voice service. Accordingly, in an uplink, the mobile station could be a transmitter, and the base station could be a receiver. Likewise, in a downlink, the mobile station could be a receiver, and the base station could be a transmitter.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone. Also, examples of the mobile station include a personal digital assistant (PDA), a hand-held PC, a notebook PC, a smart phone, and a multi mode-multi band (MM-MB) terminal.

In this case, the smart phone means a terminal having advantages of a mobile communication terminal and a personal mobile terminal in combination. Namely, the smart phone can mean a terminal that data communication functions such as schedule management, facsimile transmission and reception, and Internet access, which correspond to functions of the personal mobile terminal, are added to the mobile communication terminal. Also, the multi mode-multi band terminal means a mobile terminal having a multi-modem chip to be operated in a portable Internet system and other mobile communication systems (for example, code division multiple access (CDMA) 2000 system, WCDMA system, etc.).

The embodiments according to the present invention may be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various, means which are well known.

The embodiments of the present invention can be supported by the standard documents disclosed in any one of wireless access systems, such as an IEEE802 system, a $3^{rd}$ Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents. In addition, all the terms disclosed in the present document may be described by the above standard documents. In particular, the embodiments of the present invention may be supported by at least one of P802.16-2004, P802.16e-2005 and P802.16Rev2 documents, which are the standard documents of the IEEE802.16 system or Rel-8/36_series which is the standard document of the LTE system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

In addition, specific terms used in the embodiments of the present invention are provided for facilitating the understanding of the present invention. Such specific terms may be changed to other terms without departing from the technical spirit of the present invention.

Currently, wireless communication technology (e.g., IEEE802.16m or LTE-advanced) should offer a wider bandwidth of a maximum of 100 MHz as a system bandwidth. A method for saving the power of a Mobile Station (MS) in an efficient multi-carrier wireless communication system will now be described. In the embodiments of the present specification, it is assumed that a primary carrier is always operated in a normal mode when at least a portion of one or more secondary carriers is operated in a power saving mode (e.g., a sleep mode), in a power saving method.

1. State Transition Diagram

First, the present invention suggests a state diagram which is applicable to the operation of a secondary carrier of a multi-carrier system, which will be described with reference to FIGS. 3 to 5.

Figure 3:
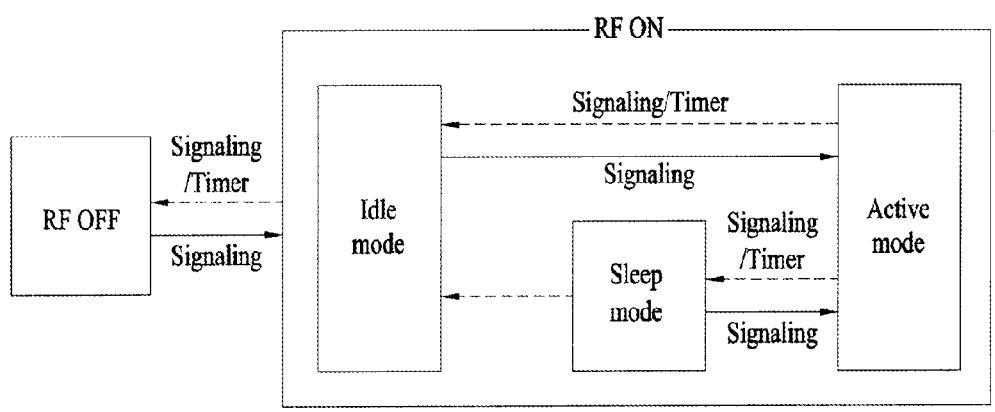
FIG. 3 is a view showing an example of a state diagram applicable to the operation of a secondary carrier according to the embodiments of the present invention.

FIG. 3 is a view showing an example of a state diagram applicable to the operation of a secondary carrier according to the embodiments of the present invention.

Referring to FIG. 3, first, a Radio Frequency (RF) OFF state indicates a state wherein an MS releases all information (e.g., connection/association or the like) about the operation of a radio carrier. That is, this state indicates a state wherein a carrier is powered off (down).

Next, an RF ON state indicates a state wherein the MS has all information (e.g., connection/association or the like) about the operation of a radio carrier. An active mode, a sleep mode and an idle mode configuring the RF ON state will now be described in detail.

1) Active Mode (or Normal Mode)

The MS may monitor the control channel of every subframe in this state and perform all normal operations.

2) Sleep Mode

This mode may have a predetermined period. The predetermined period may be divided into a sleep interval and a listening interval. During the sleep interval, the MS does not monitor the control channel of the subframe and does not perform any normal operation. In contrast, the MS monitors the control channel of the subframe and checks whether there is data transmitted to the MS, during the listening interval. The sleep mode type used in the present embodiment may include power saving modes (e.g., PSC Types 1 to 3) defined in the general wireless access system and any types which are arbitrarily defined.

3) Idle Mode

The MS does not transmit or receive any traffic on a secondary carrier in this state, but a connection between an MS and a Base Station (BS) is maintained. The MS in the idle mode does not monitor the control channel of any subframe until an indication is transmitted on a primary carrier. The transition between the RF OFF state and the RF ON state may be triggered by signaling and a timer.

First, signaling will be described. The change of the operation mode of the secondary carrier defined in one embodiment of the present invention may be performed by explicit signaling, such as Medium Access Control (MAC) message transmission, specific indication (1-bit indication or multi-bit bitmap) use, or MAC management message use. Further, the change of the operation mode may be performed by implicit signaling such as data detection using a MAP.

Next, the timer will be described. The timer used for changing the operation mode of the secondary carrier defined in one embodiment of the present invention uses a value (e.g., Secondary-Carrier Inactivity Time), which varies according to modes. This value may be negotiated between the BS and the MS prior to entering any state. In addition to negotiation, the BS may share this value with all the MSs in a cell through system information or may share this value as one of multi-carrier associated parameters during initial network entry negotiation between the MS and the BS. The timer may be allocated and operated according to MSs or the carriers of an MS. If a predetermined timer triggering condition is satisfied, the timer may be simultaneously triggered in the MS and the BS. By way of example of the timer triggering condition, the timer may be simultaneously started in both the MS and the BS when it is recognized that there is no allocation of data to a carrier, and may be stopped (or reset) when it is recognized that there is allocation of data. When the timer of a specific carrier expires, the MS may switch the mode of the carrier from an active mode to a power saving mode (e.g., a sleep mode or an idle mode). In addition, when the timer of a specific carrier expires, the BS may also perform the allocation of data to the carrier according to the predetermined power saving mode.

In the operation of the secondary carrier, a case wherein the RF OFF state and the idle mode are combined and the operation of the primary carrier is also considered will be described with reference to FIG. 4.

FIG. 4 is a view showing another example of a state diagram applicable to the operation of a secondary carrier according to the embodiments of the present invention.

First, referring to FIG. 4(a), an idle mode and a sleep mode of the secondary carrier are combined into a secondary-carrier power management mode. Transition between the modes may be performed by signaling or the expiration of a timer as described with reference to FIG. 3.

Next, the secondary-carrier power management mode shown in FIG. 4(a) is shown in detail in FIG. 4(b). The operation mode of the secondary carrier is largely divided into a secondary-carrier active state and a secondary-carrier idle state, and the secondary-carrier active state includes a normal mode and a sleep mode.

The division criterion of the normal/active state may be whether the secondary carrier is physically turned on/off, whether a logical/functional connection is established, or whether there is feedback. A case where a permanent sleep mode is further included in the sleep mode will be described with reference to FIG. 5, together with such a division criterion.

Figure 5:
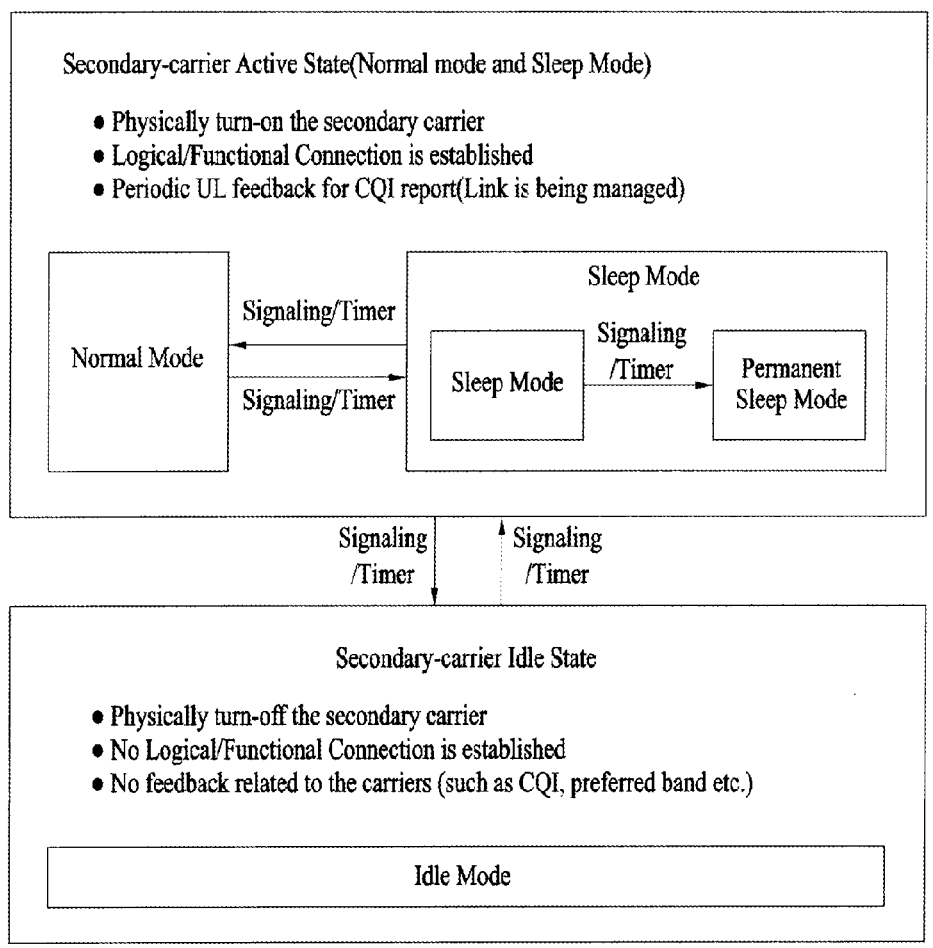
FIG. 5 is a view showing another example of a state diagram applicable to the operation of a secondary carrier according to the embodiments of the present invention.

FIG. 5 is a view showing another example of a state diagram applicable to the operation of a secondary carrier according to the embodiments of the present invention.

Referring to FIG. 5, the permanent sleep mode is added to the sleep mode of the state diagram of FIG. 4(b), as described above.

The modes of FIGS. 4 and 5 will be defined as follows.

1) Secondary-Carrier Active Mode

In the active mode, the MS has all information (connection/association or the like) about the operation of a carrier. The active mode may be transited to the sleep mode or the idle mode by signaling or the expiration of the timer, in order to reduce power consumption.

1-1) Normal Mode

In this mode, the MS may monitor the control channel of every secondary carrier and perform all normal operations. If a MAP including resource allocation information of a carrier is transmitted only on the primary carrier, the MS confirms the MAP and buffers an entire data region of the secondary carrier for successful data reception of the carrier.

1-2) Sleep Mode

An MS with a small data transmission amount buffers the data of every secondary carrier only in the listening interval and confirms MAP information, by applying the sleep interval and the listening interval to each of the secondary carriers.

In the sleep interval, the MS may receive the MAP including resource allocation information of every secondary carrier, but may not buffer the data transmitted by the secondary carriers. In contrast, in the listening interval, the MS receives the MAP including the resource allocation information of every secondary carrier. At the same time, the MS buffers the data region of the secondary carriers in advance in order to receive the data of the secondary carriers, regardless of whether there is data transmitted on the secondary carriers. This sleep mode operates on the assumption that the primary carrier is in the active (normal) mode operation.

If the transmission of data on one or more of the secondary carriers is confirmed in the listening interval, the MS transits corresponding secondary carriers to the active mode and decodes the data which is buffered in advance. It may be checked whether the data is transmitted by the data recognition of the carrier using a predetermined MAP including resource allocation information or explicit signaling transmitted on the primary carrier.

1-3) Permanent Sleep Mode

The permanent sleep mode indicates a sleep mode including only the sleep interval without the listening interval.

2) Secondary-Carrier Idle Mode

This mode indicates a state wherein the MS releases or disables all connections for the secondary carriers. In addition, the MS does not perform MAP decoding and buffering with respect to a secondary carrier until any explicit signaling/indication is transmitted on the primary carrier. In other words, this mode indicates a state wherein the power of a carrier is physically turned off (down).

In order to enable the MS to transition from this mode to the secondary-carrier active state, every procedure for establishing a connection (e.g., network re-entry) should be performed.

The modes of the state diagram may be expressed by other terms. In addition, the modes are preferably distinguished by substantial operation methods and functions, but by not the terms, and the functions or the operation methods thereof are not limited by the terms.

For example, the idle mode of FIG. 3 is similar to the permanent sleep mode of FIG. 5 and the operation of the RF OFF mode of FIG. 3 is substantially similar to that of the idle mode of FIG. 5.

2. Method for Saving Power of MS in Multi-Carrier Environment

Hereinafter, a method for efficiently saving the power of an MS in a multi-carrier wireless communication system using the above-described state diagrams and the operation mode of each of the secondary carriers will be described.

If an MS is in an active mode in a multi-carrier environment, carriers available to the MS in a cell may be preferably dynamically turned on or off according to a service or Quality of Service (QoS). A multi-carrier system requires a scheme for providing dynamic use of multiple carriers and minimizing power consumption of the MS. Prior to the description of such a scheme, an operation procedure of the MS in order to apply a power saving mode of a secondary carrier in the multi-carrier environment will be described with reference to FIG. 6.

Figure 6:
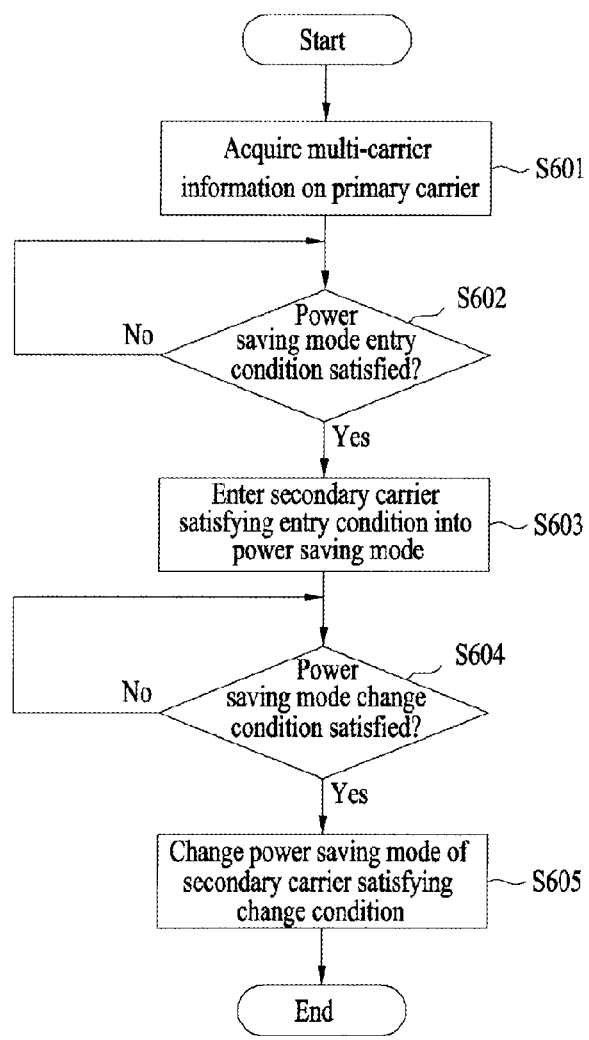
FIG. 6 is a flowchart illustrating a power saving mode entry and change procedure of a secondary carrier according to one embodiment of the present invention.

FIG. 6 is a flowchart illustrating a power saving mode entry and change procedure of a secondary carrier according to an embodiment of the present invention.

Referring to FIG. 6, first, the MS may acquire multi-carrier information from a BS on a primary carrier (S601).

At this time, the first primary carrier indicates the carrier used by the BS and the MS to exchange traffic and full PHY/MAC control information, as described above.

In addition, the multi-carrier information of the present embodiment may include information about carriers available to the MS, information indicating which of the available carriers is a primary carrier, and power saving mode entry/change/end condition information of a specific secondary carrier. The power saving mode entry/change/end condition information may include at least one of signaling information and timer information of entry/change/end.

The multi-carrier information may be included in any one broadcast channel on which system information such as Superframe Header (SFH) is transmitted, and may be transmitted to the MS in at least one format of a MAC management message, a 1-bit indicator and a multi-bit bitmap. The multi-carrier information may be transmitted to the MS whenever multiple carriers need to be controlled or with a predetermined period.

The power saving mode includes the sleep mode, the idle mode and the RF OFF mode, which are described with reference to FIGS. 3 to 5.

The MS which acquires the above-described information through the multi-carrier information may recognize one or more available secondary carriers. The MS may determine whether a condition for the entry of one or more secondary carriers into the power saving mode, that is, the power saving mode entry condition, is satisfied for the power saving of one or more secondary carriers (S602).

The power saving mode entry condition includes entry signaling and the expiration of an entry timer using the primary carrier. The entry signaling may include information indicating a specific secondary carrier, which will enter the power saving mode, of one or more secondary carriers and information indicating the power saving mode which a specific secondary carrier enters. If a specific secondary carrier enters the sleep mode, entry signaling may include information about the PSC type. Such entry signaling may be included in the multi-carrier information or may be transmitted to the MS through a MAC management message or a predetermined broadcast channel.

If the power saving mode entry condition is the expiration of the entry timer, the value of the entry timer may be determined by negotiation between the MS and the BS as described above or may be acquired by the MS on a channel for transmitting predetermined system information broadcast from the BS. In this case, the power saving mode which a specific secondary carrier enters by the expiration of the entry timer may be negotiated between the MS and the BS in advance or may be indicated to the MS through the multi-carrier information. The entry timer may be triggered when data is not allocated to a specific secondary carrier and may be initialized when data is allocated. The power saving mode entry condition may be differently applied to one or more secondary carriers.

The MS may enable the secondary carrier, which satisfies the power saving mode, out of one or more secondary carriers to enter the power saving mode (S603).

The MS may decode the control channel and buffer the data channel only in the predetermined listening interval according to the kind of the power saving mode, with respect to the secondary carrier which enters the power saving mode.

Thereafter, the MS may determine whether a power saving mode change condition is satisfied for more efficient operation of the secondary carrier (S604).

The power saving mode change condition includes change signaling or the expiration of a change timer using the primary carrier, similar to the power saving mode entry condition. The change signaling may include information indicating a specific secondary carrier, the power saving mode of which will be changed, of one or more secondary carriers which enter the power saving mode, and information indicating to which power saving mode a specific secondary carrier is changed from a current power saving mode. If a specific secondary carrier is changed to the sleep mode, change signaling may include information about the PSC type. Such change signaling may be included in the multi-carrier information or may be transmitted to the MS through a MAC management message or a predetermined broadcast channel.

If the power saving mode change condition is the expiration of the change timer, the value of the change timer may be determined by negotiation between the MS and the BS as described above or may be acquired by the MS on a channel for transmitting predetermined system information broadcast from the BS. In this case, the power saving mode of a specific secondary carrier changed by the expiration of the change timer may be negotiated between the MS and the BS in advance or may be indicated to the MS on the multi-carrier information. The change timer may be triggered when a specific secondary carrier enters the power saving mode and may be reset when data is allocated. The power saving mode change condition may be differently applied to one or more secondary carriers which enter the power saving mode.

The MS may change the power saving mode of the secondary carrier, which satisfies the power saving mode change condition, out of one or more secondary carriers which enter the power saving mode (S605).

Thereafter, the MS may receive the control channel of the secondary carrier, monitor whether data is allocated, and buffer the data channel, in the listening interval according to the changed power saving mode of the secondary carrier.

Hereinafter, the efficient control method of the secondary carrier applicable to the present embodiment will be described in detail.

2.1 Secondary Carrier Control Using Explicit Signaling

According to one embodiment of the present invention, a method for minimizing the power consumption of an MS by reporting whether the control channels of the secondary carriers are monitored and used on the primary carrier through explicit signaling is provided, which will be described with reference to FIG. 7.

Figure 7:
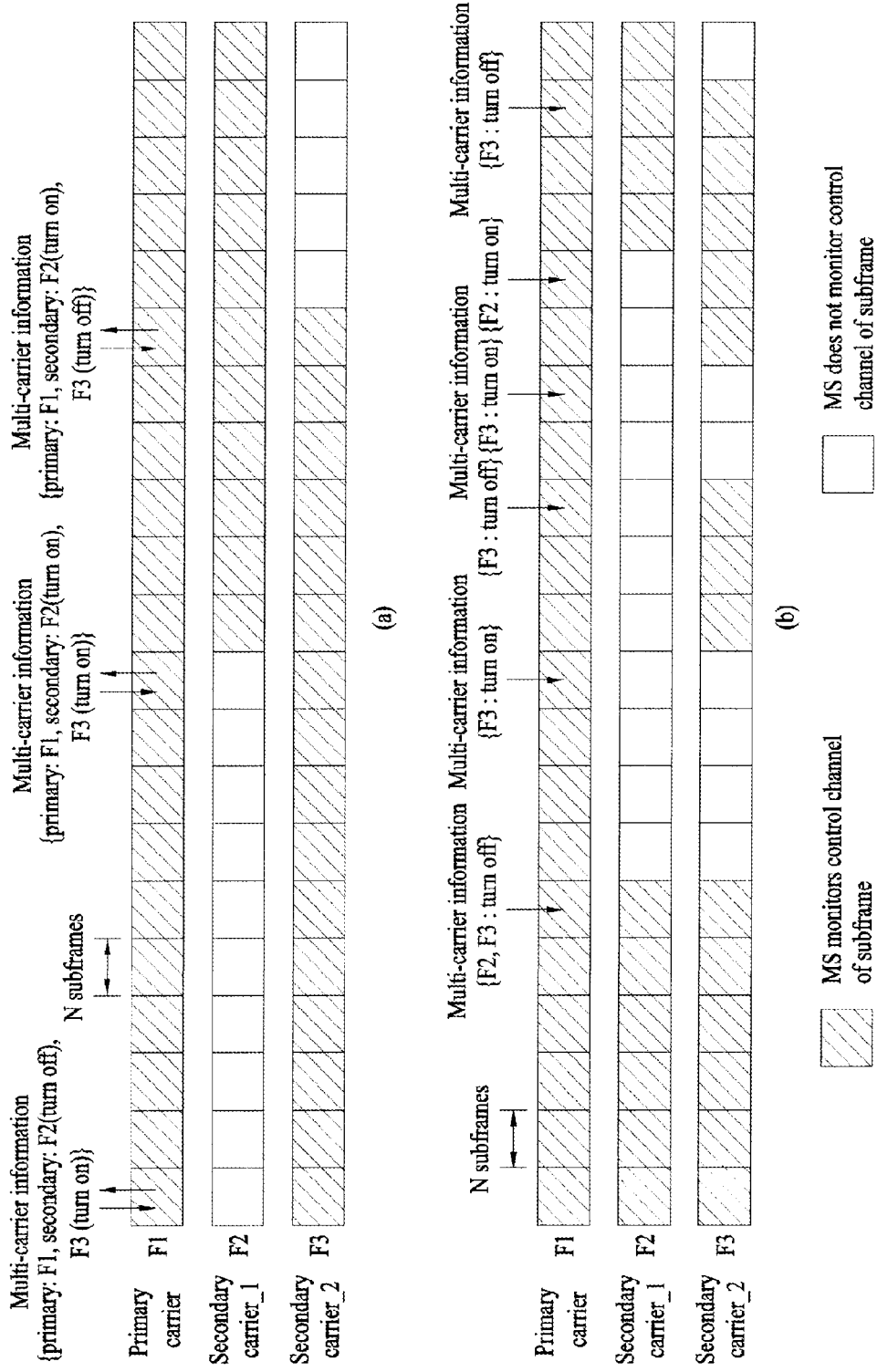
FIG. 7 is a view showing an example of a state transition method of a secondary carrier using signaling according to one embodiment of the present invention.

FIG. 7 is a view showing an example of a state transition method of a secondary carrier using signaling according to one embodiment of the present invention.

In FIGS. 7(a) and 7(b), it is assumed that an MS uses a total of three carriers including one primary carrier and two secondary carriers. In addition, in the following drawings including FIG. 7, one block represents N subframes. N is a natural number and preferably a natural number satisfying $N=2^{\wedge}M$ (M is an integer of 0 or more).

Referring to FIG. 7(a), the dynamic change of the use of each carrier may be performed using signaling on the primary carrier. At this time, the primary carrier is preferably one of fully configured carriers. This is because the parameter and information related to multi-carrier operation is transmitted on the fully configured carriers. First, the multi-carrier information including the control information of the multiple carriers may be transmitted to the MS on the primary carrier.

As shown in FIG. 7(a), the multi-carrier information which is initially transmitted includes a turn-off (that is, the control channel is not monitored or the data channel is not buffered) indication for a secondary carrier 1 (F2) and a turn-on indication for a secondary carrier 2 (F3). The secondary carriers perform the operations according to the indications corresponding thereto. The multi-carrier information which is secondarily transmitted includes the turn-on indication for both secondary carriers. Accordingly, both secondary carriers enter a turn-on state and perform the normal mode operation.

The MS may monitor the control channel and buffer the data channel with respect to a secondary carrier in the turn-on state. In addition, the MS may not monitor the control channel and buffer the data channel with respect to a secondary carrier in a turn-off state.

The MS may immediately perform the transition of the operation state of a secondary carrier in a subframe in which the multi-carrier information is received or perform the transition of the operation state at a delay (e.g., N subframes) of a predetermined subframe.

Next, in FIG. 7(b), only the indication information for a changed secondary carrier is transmitted through the multi-carrier information, unlike FIG. 7(a) in which indication information for all the secondary carriers are included. In this case, signaling overhead may be reduced compared with FIG. 7(a).

Meanwhile, in the present embodiment, signaling for data direction (downlink/uplink) may also be signaled with respect to all cases, similar to the general wireless access system. That is, in the present embodiment, all the uplink and/or downlink turn-on/off information of the secondary carriers may be transmitted on the primary carrier. In this way, since the use/non-use of the secondary carrier may be rapidly changed in a situation in which a data rate is dynamically changed, the MS may efficiently use multiple carriers.

In addition, if packets (e.g., TCP ACKs and various system messages such as paging and random-access response) having relatively small sizes are transmitted or received, no advantage may be obtained through use of a large bandwidth. Accordingly, data is preferably transmitted or received only using a base bandwidth (i.e., primary carrier) of a general system. Therefore, when the BS instructs the MS to turn off carriers through explicit signaling in order to prevent carriers, which do not need to be monitored, from being monitored, the overall system performance and the power saving of the MS can be improved.

2.2 Entry of Secondary Carrier into Sleep Mode Through Signaling

The present invention provides a method for applying a sleep mode to secondary carriers which do not require monitoring of a control channel of every subframe in order to minimize power consumption of an MS and signaling overhead.

In the present method, the sleep mode is applied to one or more secondary carriers based on a primary carrier as necessary such that the MS recognizes the transmission of data related to the secondary carriers by monitoring the control channel in a listening interval. Accordingly, different types (patterns) of the sleep mode are applied according to the service of the MS or the data types such that the MS more efficiently uses the secondary carriers. This will be described with reference to FIG. 8.

Figure 8:
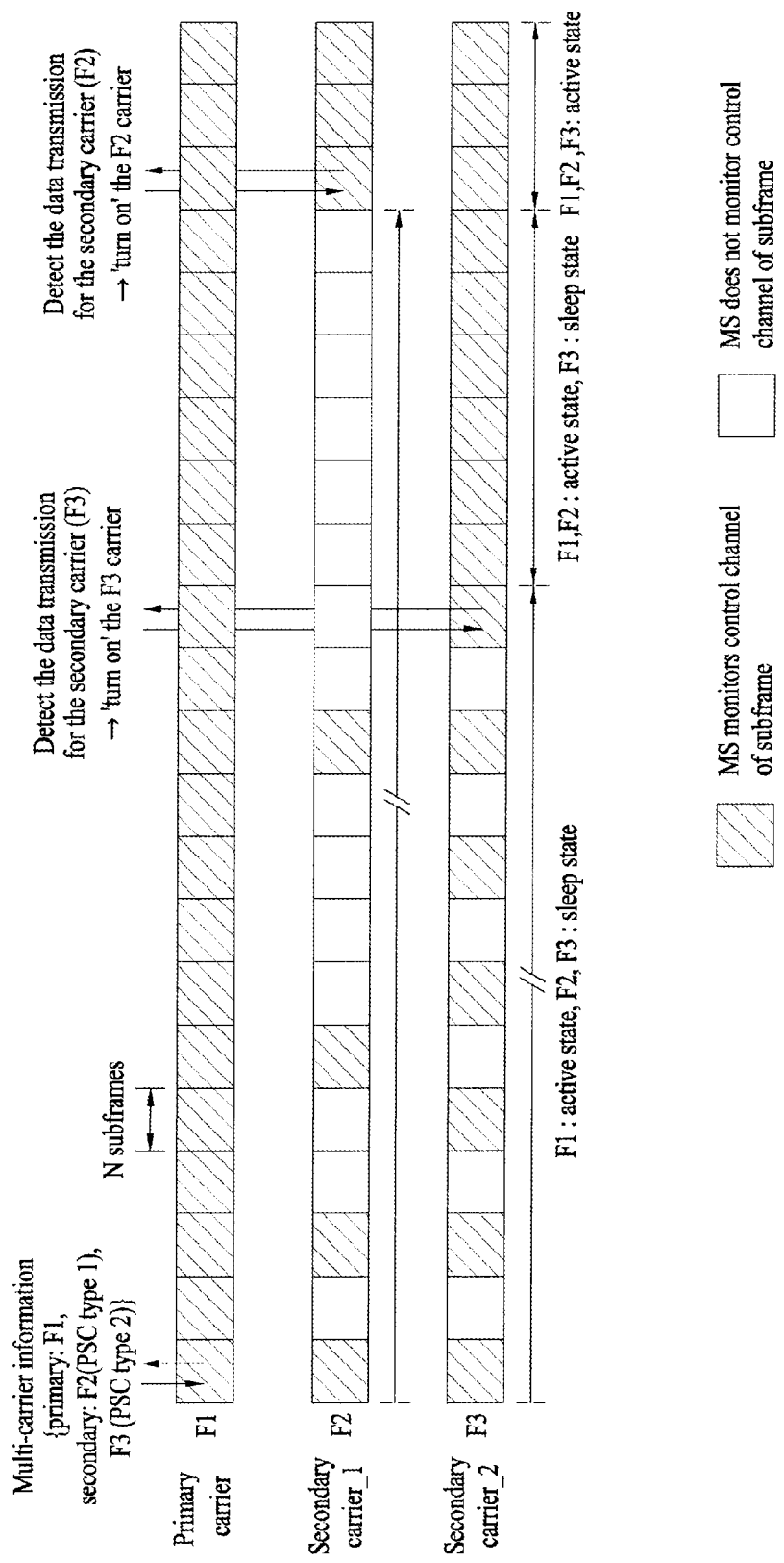
FIG. 8 is a view showing an example of a transition method of a secondary carrier to a sleep mode using signaling according to one embodiment of the present invention.

FIG. 8 is a view showing an example of a transition method of a secondary carrier to a sleep mode using signaling according to an embodiment of the present invention.

In FIG. 8, it is assumed that the MS uses a total of three carriers including one primary carrier and two secondary carriers. It is assumed that the monitoring of the control channel of every subframe is not required with respect to some of the carriers allocated to the MS, that is, a secondary carrier 1 and a secondary carrier 2. In addition, the operation of the sleep mode applied to each secondary carrier is as described above with reference to FIGS. 3 to 6.

In this case, a BS may enable each secondary carrier to enter the sleep mode by signaling using the primary carrier, for the efficient operation of the MS. Since the sleep mode is applied to the secondary carrier by signaling, the MS and the BS may be synchronized with each other. In addition, if there is data to be transmitted on a secondary carrier, the BS may directly transmit data through the listening interval of the secondary carrier without transmitting additional multi-carrier information on the primary carrier. At this time, the MS may recognize the data transmitted in the listening interval such that the secondary carrier transitions to a turn-on state. The sleep mode of each carrier may be applied to all types, which are defined in the general wireless access system in advance, according to the service/data type of the MS and the network state.

For example, it is assumed that a PSC type 2 applied to F3 (secondary carrier 2) of FIG. 8 follows a sleep mode type (PSC) defined in the IEEE802.16e system. In this case, the MS cannot transmit an MSDU (or a MPDU) during a sleep interval of a sleep mode, but can transmit or receive feedback (ACK/NACK) of data as well as the MSDU or fragments generated in connections during a listening interval.

In the present method, unlike the general wireless access system, the MS receives more than data transmitted periodically during the listening interval. That is, the MS which recognizes the data transmitted to the MS on the carrier may turn on the secondary carrier without the additional multi-carrier information using the primary carrier so as to switch the secondary carrier to an active state. In addition, the secondary carrier in the active state may transition to the sleep mode again by signaling (multi-carrier information) of the primary carrier or the expiration of a predetermined timer.

Referring to FIG. 8 again, the MS may receive multi-carrier information on the primary carrier. The multi-carrier information may include information about carriers available to the MS, information indicating which of the available carriers is the primary carrier, information indicating whether a specific secondary carrier is turned on/off, information indicating the sleep mode type of a specific secondary carrier, and the like.

According to such multi-carrier information, F2 is operated in a PSC type 1, and F3 is operated in a PSC type 2. In the PSC type 1, a listening interval and a sleep interval are alternately repeated. The length of the listening interval is constant, but the length of the sleep interval may be twice a previous sleep interval. In addition, in the PSC type 2, a listening interval and a sleep interval are repeated with a constant length.

When the data transmission is detected in the listening interval while F3 is operated in the PSC type 2, the MS may finish the sleep mode operation and immediately change F3 to an active mode. Next, when the data transmission is detected in the listening interval while F2 is operated in the PSC type 1, the MS may finish the sleep mode operation with respect to F2 and immediately change F2 to an active mode.

2.3 Entry of Secondary Carrier into RF OFF Mode Using Timer

The present invention provides a method for enabling a carrier to transition from a sleep mode to an RF OFF state when data is not transmitted on a secondary carrier entering the sleep mode during a predetermined time (e.g., inactivity timer). The timer may be set to different values according to the type (i.e., PSC) of the sleep mode applied to the carrier. That is, inactivity timers having different values may be applied according to the type of the sleep mode applied to each of a plurality of carriers allocated to any MS. At this time, the RF ON/OFF mode is as described above with reference to FIG. 4 and a description thereof will be omitted herein.

Figure 9:
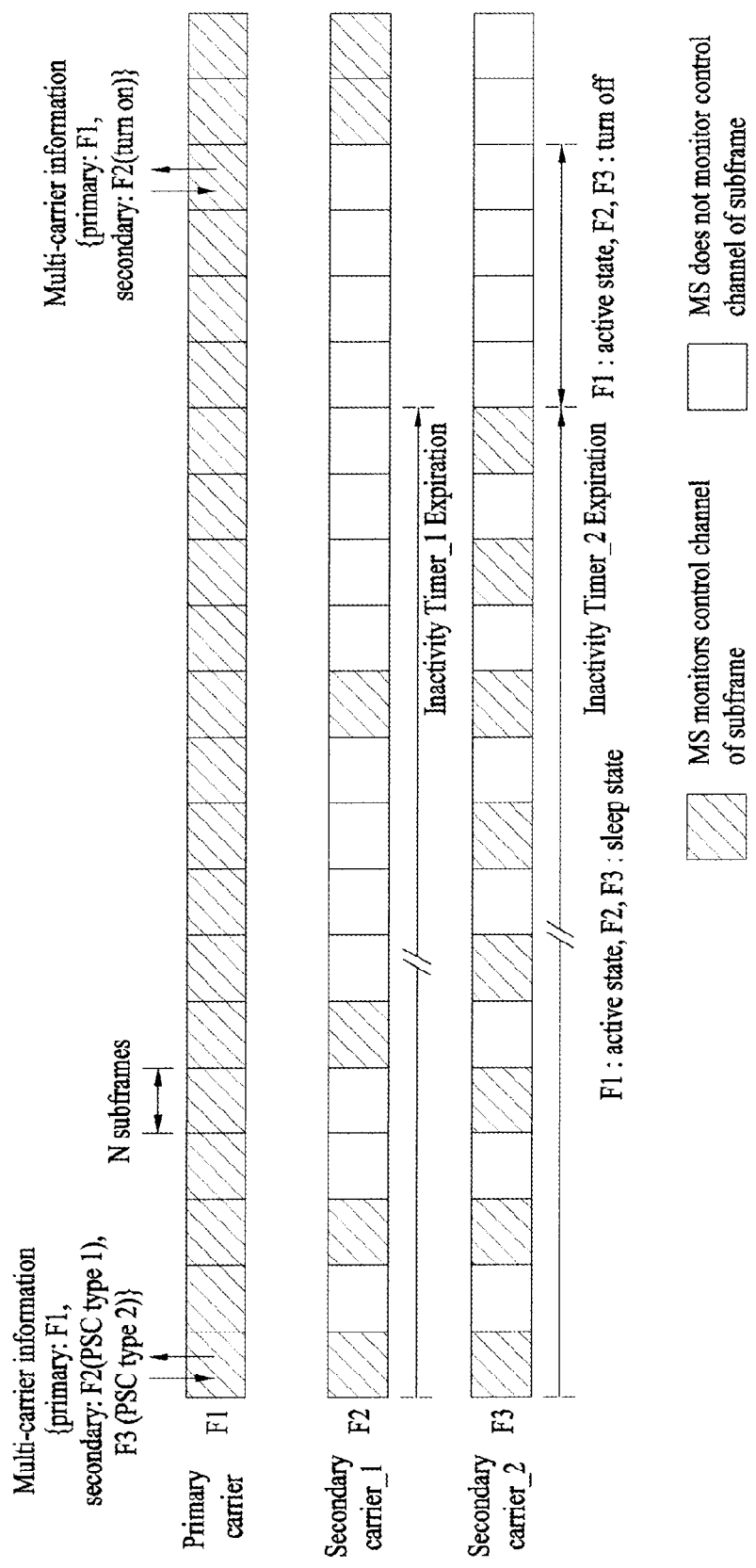
FIG. 9 is a view showing an example of a transition method of a secondary carrier to an RF OFF mode using a timer according to one embodiment of the present invention.

FIG. 9 is a view showing an example of a transition method of a secondary carrier to an RF OFF mode using a timer according to an embodiment of the present invention.

Referring to FIG. 9, a carrier F2 is operated in a PSC type 1 and a carrier F3 is operated in a PSC type 2. At this time, different inactivity timers may be set according to carriers (PSC types). That is, inactivity timer_1 is set with respect to F2 (PSC type 1) and inactivity timer_2 is set with respect to F3 (PSC type 2).

Thereafter, as the inactivity timers set according to the carriers (or the PSC types) expire, the carriers F2 and F3 are operated in an RF OFF mode. This is only exemplary. Alternatively, each secondary carrier may transition to another power saving mode instead of the RF OFF mode as its inactivity timer expires.

Thereafter, with respect to F2 entering the RF OFF state by the expiration of the inactivity timer, if there is data to be transmitted by the BS or the MS, the carrier may enter the active mode state again by signaling (multi-carrier information) using the primary carrier. The present method can efficiently save the power of the MS while reducing signaling overhead, compared with the method of using only signaling.

2.4 State Transition of Secondary Carrier Using Timer

The present invention provides a method for performing the state transition of a secondary carrier based on a timer, which will be described with reference to FIG. 10.

Figure 10:
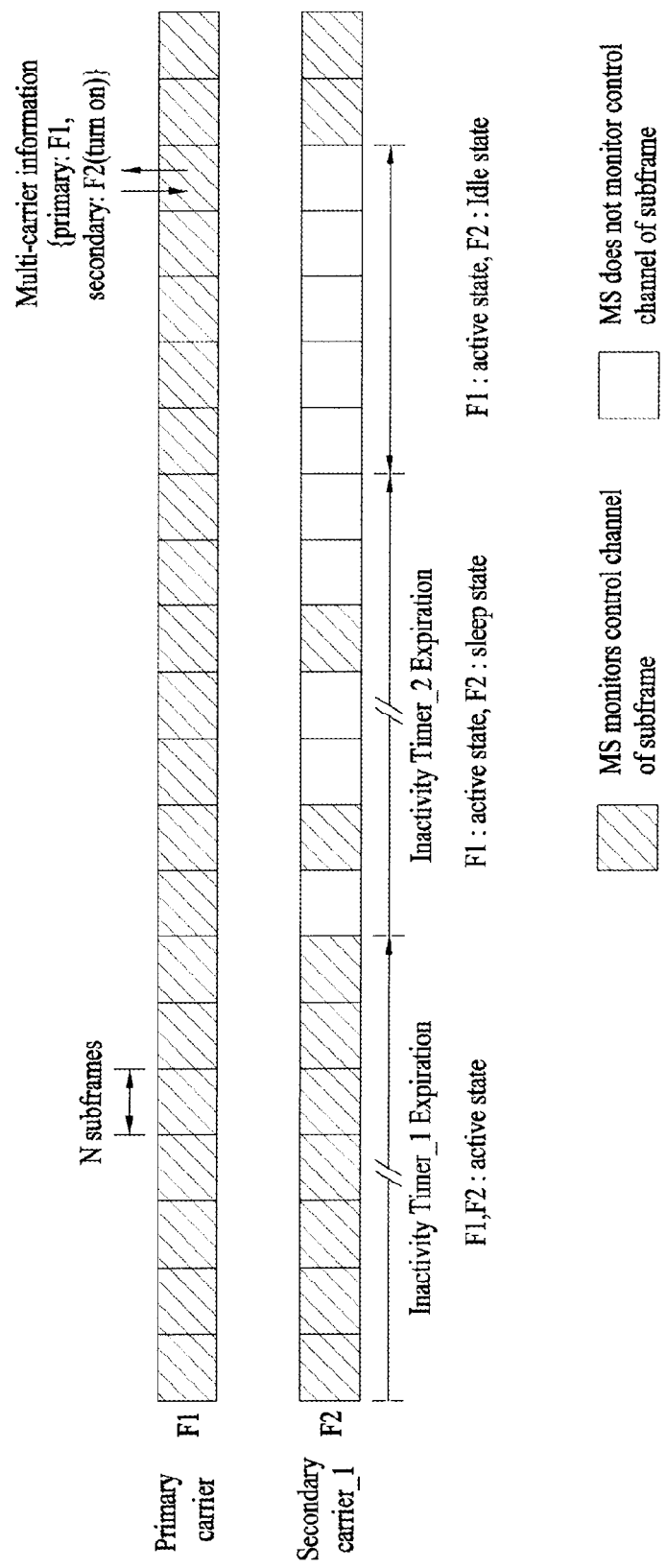
FIG. 10 is a view showing an example of a transition method of a secondary carrier to a sleep mode using a timer according to one embodiment of the present invention.

FIG. 10 is a view showing an example of a transition method of a secondary carrier to a sleep mode using a timer according to one embodiment of the present invention.

Referring to FIG. 10, inactivity timer_1 is triggered when any MS does not recognize traffic transmitted on a secondary carrier in an active state.

If inactivity timer_1 expires, secondary carrier_1 enters a sleep mode. However, in the present method, since the MS transitions to the sleep mode without explicit signaling, it is preferable that the type of the sleep mode entered by the expiration of a timer be defined according to carriers in advance. In the present embodiment, it is assumed that the sleep mode entered by the expiration of the timer is a PSC type 1.

If secondary carrier_1 is operated in a sleep mode, an MS immediately triggers inactivity timer_2 and monitors data transmitted to the MS during a listening interval. If no data is transmitted to the MS before inactivity timer_2 expires, the MS switches the secondary carrier to an idle mode after the expiration of inactivity timer_2 and does not monitor any control channel. Thereafter, another timer (e.g., inactivity timer_3) is triggered, and the MS may enter a secondary carrier into an RF OFF mode by the expiration of another timer.

At this time, inactivity timer_1 and inactivity timer_2 may have the same value or different values. In either case, it is preferable that the BS and the MS know the value of the timer in advance.

Such transition may be used in the transition of all secondary modes (that is, RF_ON_active→RF_ON_sleep, RF_ON_active→RF_ON_idle, RF_ON_sleep→RF_ON_idle, RF_ON→RF_OFF).

2.5. State Transition Using Timer and Signaling

The present invention provides a method for enabling a secondary carrier to transition to another state mode using signaling even while a timer is used, with respect to an MS using the timer in the state transition of the secondary carrier, which will be described with respect to FIG. 11.

Figure 11:
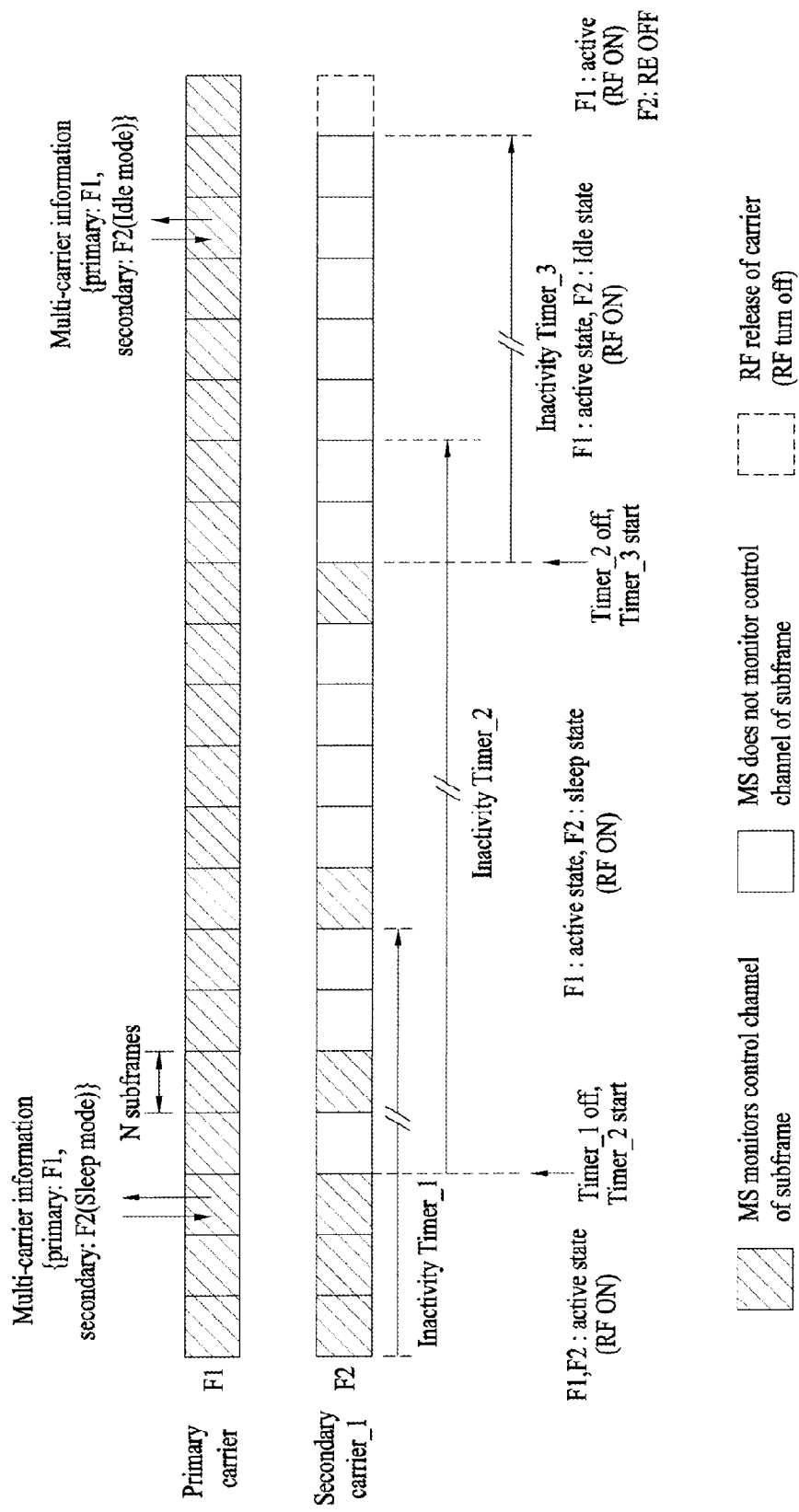
FIG. 11 is a view showing a transition method of a secondary carrier to a sleep mode using signaling and a timer together according to one embodiment of the present invention.

FIG. 11 is a view showing a transition method of a secondary carrier to a sleep mode using signaling and a timer together according to one embodiment of the present invention.

Referring to FIG. 11, inactivity timer_1 is immediately triggered when any MS does not detect traffic transmitted on a secondary carrier in an active state. However, unlike FIG. 10, the secondary carrier may be immediately operated in a sleep mode if there is signaling (multi-carrier information) through a primary carrier even before inactivity timer_1 expires. The secondary carrier is operated in the sleep mode. At the same time, inactivity timer_1 is released, and inactivity timer_2 is triggered. The secondary carrier may immediately transition to an idle mode during the sleep mode, if there is signaling through the primary carrier even before inactivity timer_2 expires. Accordingly, inactivity timer_2 may be released and inactivity timer_3 may be triggered. If inactivity timer_3 expires, the secondary carrier may be operated in an RF OFF mode.

The operation mode change order of the secondary carrier described in the present embodiment is only exemplary and any mode may be added or omitted.

3. Multi-Level Sleep Mode of Secondary Carrier

A Discontinuous Reception (DRX) mode may be used for conserving MS power. In this mode, when the MS receives a predetermined carrier, a listening interval and a sleep mode are repeated and a ratio of the sleep mode is gradually increased if a predetermined condition is satisfied. This mode will be described with reference to FIG. 12.

Figure 12:
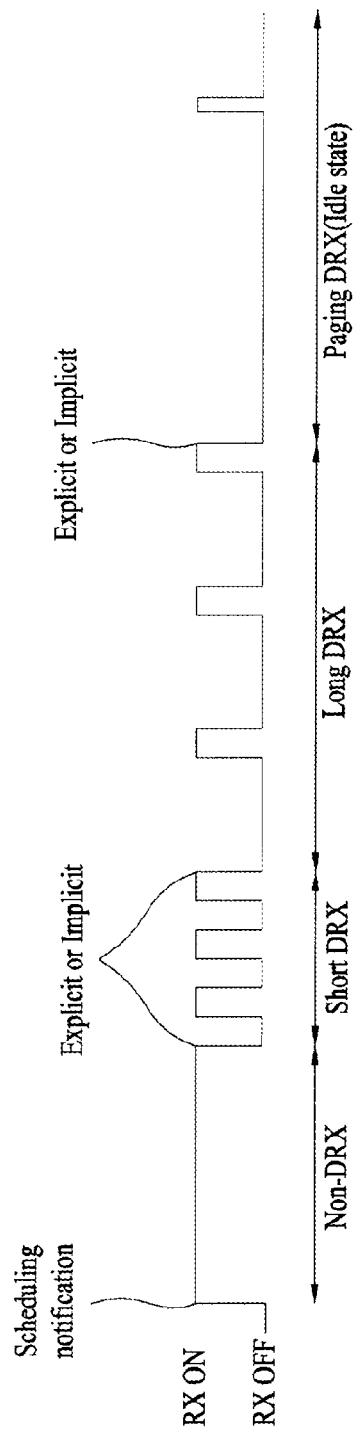
FIG. 12 is a view showing a general discontinuous reception mode of an MS.

FIG. 12 is a view showing a general DRX mode.

Referring to FIG. 12, when an MS in a non-DRX (active mode) state does not receive any data during a predetermined time, the MS may sequentially enter a short DRX (sleep mode), a long DRX (sleep mode) and a paging DRX (idle mode) through signaling or a timer. If the MS in the DRX mode detects that there is data scheduled to the MS through a control channel during a listening interval, the MS is immediately switched to the non-DRX mode so as to receive the data.

According to another embodiment of the present invention, a method for applying such a DRX mode to a secondary carrier of a multi-carrier environment and operating a multi-level sleep mode is provided.

FIG. 13 is a view showing an example of a multi-level sleep mode operation method of a secondary carrier according to another embodiment of the present invention. In FIG. 13, it is assumed that all multiple carriers are operated in an active mode when an MS enters a cell.

First, referring to FIG. 13(a), each secondary carrier may be switched to a DRX mode using only a timer without signaling. First, each secondary carrier is operated in an active mode and, at the same time, inactivity timer_1 is triggered. When inactivity timer_1 expires, each secondary carrier is operated in a short DRX mode and, at the same time, inactivity timer_2 is triggered. Thereafter, when inactivity timer_2 expires, each secondary carrier may be operated in a long DRX mode and, at the same time, inactivity timer_3 may be triggered. As shown, one block may be composed of two subframes.

Next, referring to FIG. 13(b), when an MS receives signaling (multi-carrier information) indicating that a specific carrier (that is, a secondary carrier), which may be aggregated with a primary carrier, enters a DRX mode from a BS, the secondary carrier may immediately enter the indicated DRX mode. Even in this case, the secondary carrier may enter the DRX mode using a timer.

The secondary carrier which enters the DRX mode by the expiration of the timer or signaling immediately enters a short DRX mode from a next subframe and the MS may operate inactivity timer_1 of the short DRX mode. When the MS monitors a control channel in a listening interval and detects data transmitted to the MS, the MS may switch the secondary carrier to an active state and continuously receive data.

If inactivity timer_1 in the short DRX mode expires or signaling is received on the primary carrier, the secondary carrier enters a long DRX mode. At the same time, the MS operates an inactivity timer (inactivity timer_2) in the long DRX mode. The MS monitors a control channel in a listening interval even in the long DRX mode, similar to the short DRX mode. At this time, when the MS recognizes that data is transmitted to the MS, the MS may immediately switch the carrier to an active mode and continuously receive the data.

The long DRX mode has a ratio of a listening interval to a sleep interval lower than that of the short DRX mode.

If an inactivity timer in the long DRX mode expires or signaling is received on the primary carrier, the MS may transition the carrier to a paging DRX (idle state) and maintain the carrier in an RF OFF state until signaling is received from the BS. This is because; even when the primary carrier is in the active mode, the MS transitions to the paging DRX mode and thus a paging message transmitted on the secondary carrier does not need to be monitored. If the MS receives an instruction for the use of the secondary carrier from the BS on the primary carrier, the secondary carrier may be switched to the active state.

3.1 Application of Different DRX Modes According to Secondary Carriers

In another embodiment of the present invention, a DRX mode of an MS using multiple carriers may be switched to a short DRX mode, a long DRX mode and a turn-off mode in this order. In the present embodiment, if the number of carriers which enter the DRX mode is two or more, a method for applying different DRX modes according to carriers is provided.

A carrier on which data is not transmitted may enter the DRX mode by the expiration of a timer or signaling transmitted from a BS. At this time, a short DRX mode may be applied to a preferred carrier and a long DRX mode or a turn-off mode may be directly applied to the other carriers. This method is more efficient for power saving. This will be described with reference to FIG. 14.

Figure 14:
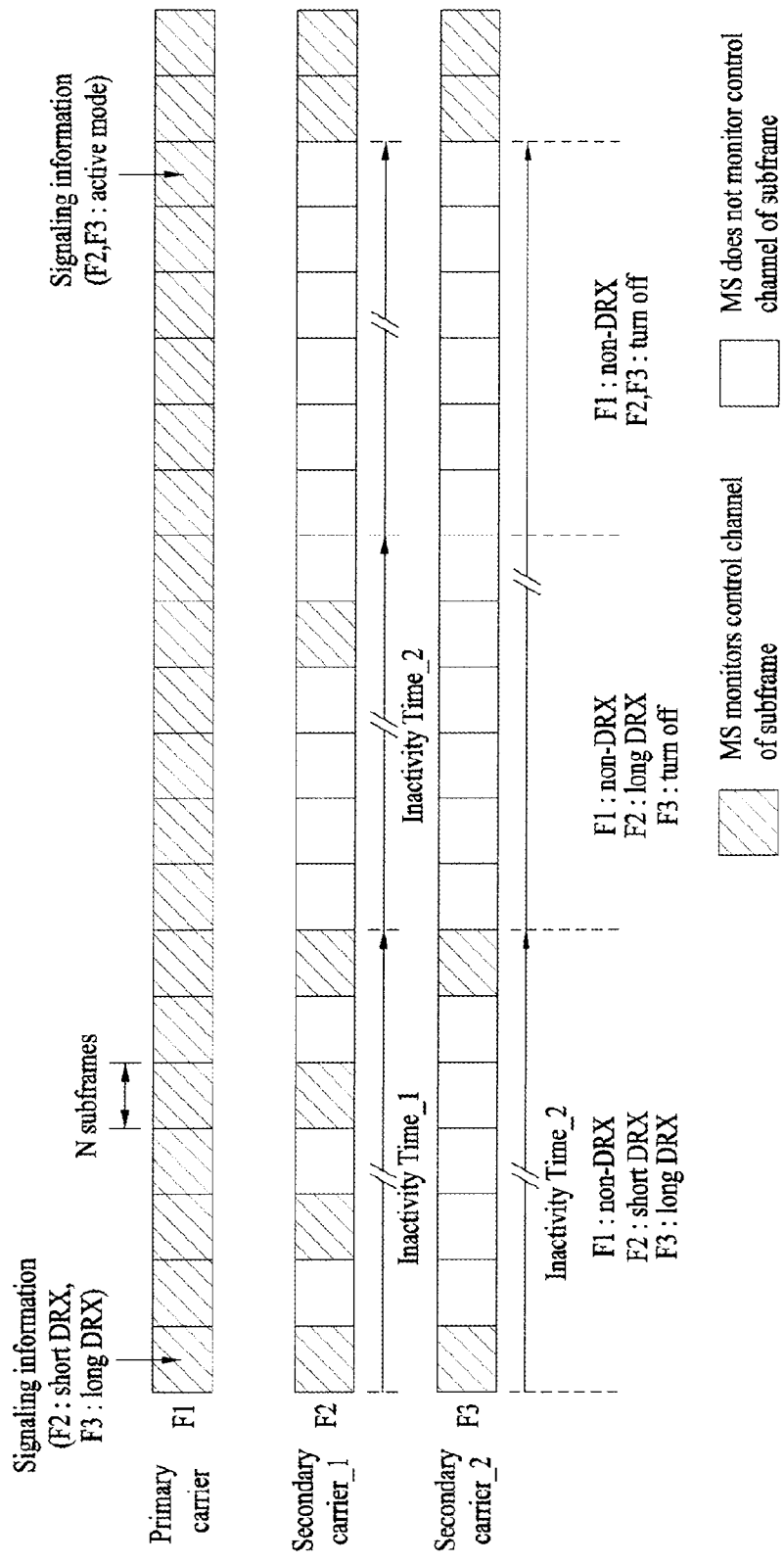
FIG. 14 is a view showing an example of a method for applying different DRX modes according to carriers, according to another embodiment of the present invention.

FIG. 14 is a view showing an example of a method for applying different DRX modes according to carriers, according to another embodiment of the present invention.

Referring to FIG. 14, an MS operates a carrier F2 in a short DRX mode according to signaling through a primary carrier and operates a carrier F3 in a long DRX mode. At the same time, the MS triggers inactivity timer_1 corresponding to the short DRX mode with respect to the carrier F2 and triggers inactivity timer_2 corresponding to the long DRX mode with respect to the carrier F3. Thereafter, if inactivity timer_1 for the carrier F2 expires, the MS operates the carrier F2 in the long DRX mode and, at the same time, triggers inactivity timer_2. If inactivity timer_2 for the carrier F3 expires, the MS may turn off the carrier F3. If inactivity timer_2 for the carrier F2 also expires, the MS may turn off the carrier F2. Thereafter, the MS may turn on the carriers F2 and F3 according to signaling (multi-carrier information) through the primary carrier.

3.2. Setting of Listening Interval of Carriers in DRX Mode

According to another embodiment of the present invention, a method for applying a DRX mode so as to determine listening intervals of secondary carriers different from each other if the number of secondary carriers which enter a DRX mode is two or more is provided, which will be described with reference to FIG. 15.

Figure 15:
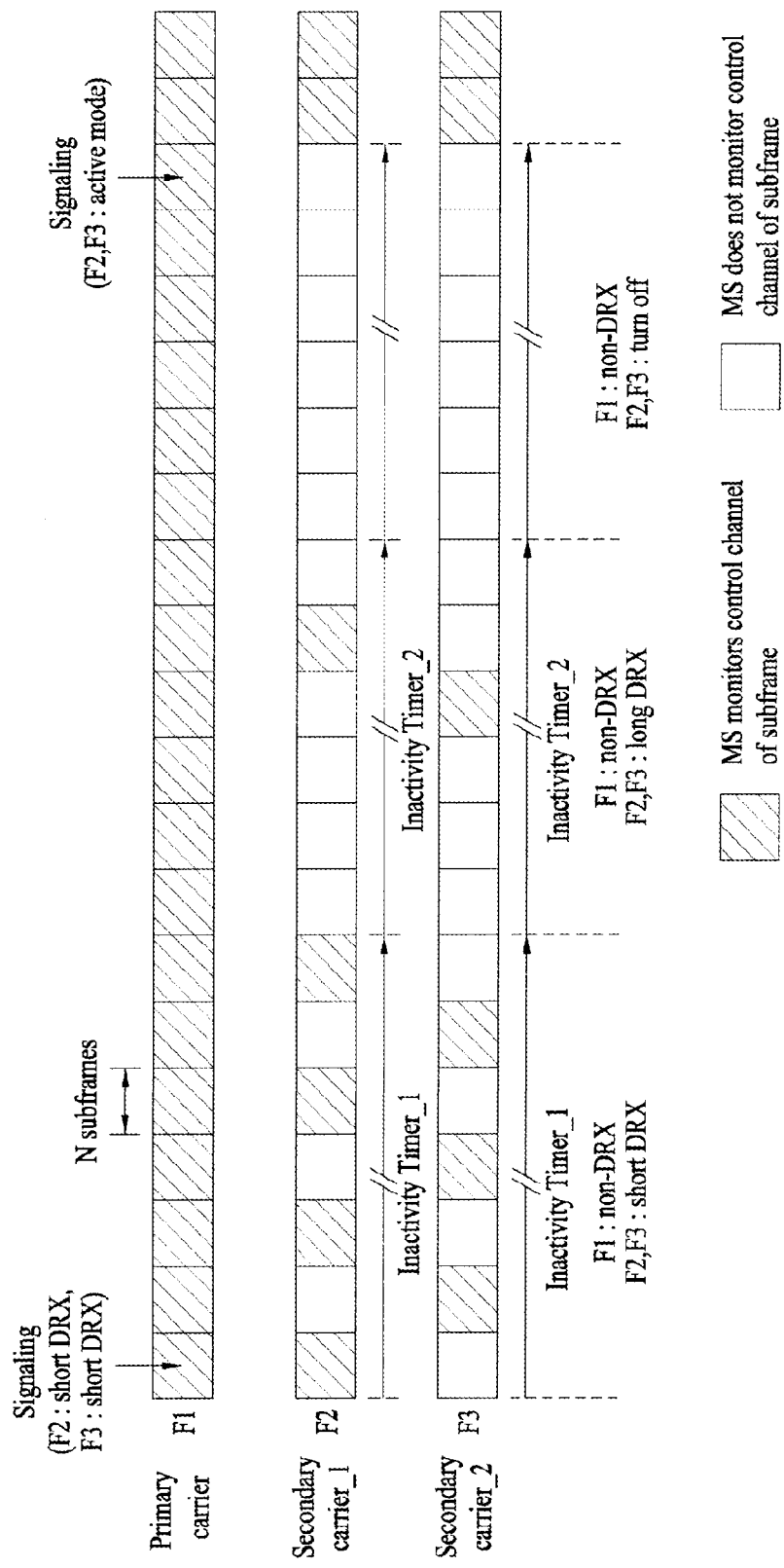
FIG. 15 is a view showing an example of a method for applying a DRX mode so as to change a listening interval according to carriers, according to another embodiment of the present invention.

FIG. 15 is a view showing an example of a method for applying a DRX mode so as to change a listening interval according to carriers, according to another embodiment of the present invention.

Referring to FIG. 15, both secondary carriers F2 and F3 may enter a short DRX mode by signaling. At this time, the carrier F3 is operated in a sleep interval while the carrier F2 is operated in a listening interval, and the carrier F3 is operated in the listening interval while the carrier F2 is operated in the sleep mode, such that each control channel is monitored.

If both the carriers F2 and F3 are operated in a long DRX mode, a ratio of the listening interval to the sleep mode is relatively low. In this case, the long DRX mode of the carriers F2 and F3 maintains the ratio of the listening interval to the sleep mode and the listening intervals may be set so as not to overlap with each other.

In this way, a BS may more rapidly use multiple carriers if a wider bandwidth is required. Accordingly, the present method reduces the battery consumption of the MS and is more efficient in fast switching.

As a still further embodiment of the present invention, the mobile station and the base station through which the embodiments of the present invention can be performed will be described with reference to FIG. 5 to FIG. 20.

The mobile station can be operated as a transmitter in the uplink, and can be operated as a receiver in the downlink. Also, the base station can be operated as a receiver in the uplink, and can be operated as a transmitter in the downlink. Namely, the mobile station and the base station can include a transmitter and a receiver to transmit information or data.

The transmitter and the receiver can include processor, module, part, and/or means for performing the embodiments of the present invention. Particularly, the transmitter and the receiver can include a module (means) for encoding a message, a module for decoding the encoded message, and an antenna for transmitting and receiving the message.

The mobile station used in the embodiments of the present invention can include a low power radio frequency (RF)/intermediate frequency (IF) module. Also, the mobile station can include a means, module or part for performing controller function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

The base station can transmit data received from an upper layer to the mobile station by wireless or wire. The base station can include a low power RF/IF module. Also, the base station can include a means, module or part for performing controller function, orthogonal frequency division multiple access (OFDMA) packet scheduling, time division duplex (TDD) packet scheduling and channel multiplexing function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

MODE FOR INVENTION

Various embodiments have been described in the best mode for carrying out the invention.

INDUSTRIAL APPLICABILITY

The embodiments of the present invention are applicable to various wireless access systems. Examples of the various wireless access systems include a 3$^{rd}$ Generation Partnership Project (3GPP) system, a 3GPP2 system and/or Institute of Electrical and Electronic Engineers 802 (IEEE802.xx) system. The embodiments of the present invention are applicable to the various wireless access system and all technical fields using the various wireless access systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for saving power by a receiving end in a multi-carrier wireless communication system, the method comprising:
   acquiring multi-carrier information from a transmitting end on a first carrier, wherein the multi-carrier information includes information about a plurality of available carriers, information indicating the first carrier, at least two second carriers among the plurality of available carriers, an indicator which indicates whether the receiving end needs to enter a sleep mode on each of the at least two second carriers or not, and a sleep mode type indicator which indicates a sleep mode type which the receiving end is to apply to each of the at least two second carriers, wherein different sleep mode types have different sleeping and listening intervals, and wherein the different sleep mode types are applied to different second carriers among the at least two second carriers;
   entering the sleep mode on a second carrier among the at least two second carriers in accordance with the mode type indicator when the indicator indicates that the receiving end needs to enter the sleep mode on the second carrier among the at least two second carriers; and
   receiving data on the second carrier among the at least two second carriers during a listening interval.

2. The method according to claim 1, wherein the first carrier is a primary carrier used by the transmitting end and the receiving end to exchange traffic and full Physical (PHY)/Media Access Control (MAC) control information.

3. The method according to claim 1, further comprising completing the sleep mode and entering a normal mode on a specific second carrier, if data is received in the listening interval or there is normal-mode entry signaling on the first carrier.

4. A receiving apparatus in a multi-carrier wireless communication system, the receiving apparatus comprising:
   a receiver including a processor, the processor configured to execute instructions to cause the receiving apparatus to:
   acquire multi-carrier information from a transmitting end on a first carrier, wherein the multi-carrier information includes information about a plurality of available carriers, information indicating the first carrier, at least two second carriers among the plurality of available carriers, an indicator which indicates whether the receiving end needs to enter a sleep mode on each of the at least two second carriers or not, and a sleep mode type indicator which indicates a sleep mode type which the receiving end is to apply to each of the at least two second carriers, wherein different sleep mode types have different sleeping and listening intervals, and wherein the different sleep mode types are applied to different second carriers among the at least two second carriers; and
   enter the sleep mode on a second carrier among the at least two second carriers in accordance with the mode type indicator when the indicator indicates that the receiving end needs to enter the sleep mode on the second carrier among the at least two second carriers; and receiving data on the second carrier among the at least two second carriers during a listening interval.

5. The receiving apparatus according to claim 4, wherein the first carrier is a primary carrier used by the transmitting end and the receiving end to exchange traffic and full Physical (PHY)/Media Access Control (MAC) control information.

6. The receiving apparatus according to claim 4, wherein the receiving apparatus is further configured to complete the sleep mode and entering a normal mode on a specific second carrier, if data is received in the listening interval or there is normal-mode entry signaling on the first carrier.

* * * * *